(12) United States Patent
Vishnu et al.

(10) Patent No.: US 8,776,191 B2
(45) Date of Patent: Jul. 8, 2014

(54) TECHNIQUES FOR REDUCING STORAGE SPACE AND DETECTING CORRUPTION IN HASH-BASED APPLICATION

(75) Inventors: Vardhan Itta Vishnu, Peddapalli (IN); Hithalapura Basavaraj Puttali, Brooklyn, NY (US)

(73) Assignee: Novell Intellectual Property Holdings, Inc., Provo, UT (US)

(*) Notice: Subject to any disclaimer, the term of this patent is extended or adjusted under 35 U.S.C. 154(b) by 1512 days.

(21) Appl. No.: 12/019,671

(22) Filed: Jan. 25, 2008

(65) Prior Publication Data
US 2009/0193224 A1 Jul. 30, 2009

(51) Int. Cl.
*G06F 21/00* (2013.01)
(52) U.S. Cl.
USPC ........ 726/6; 713/168; 711/216; 711/E12.001; 711/108; 726/3; 380/30
(58) Field of Classification Search
USPC .......................... 711/5, 127; 726/2, 6; 380/30
See application file for complete search history.

(56) References Cited

U.S. PATENT DOCUMENTS

| | | | |
|---|---|---|---|
| 4,709,345 A | 11/1987 | Vu | |
| 5,663,896 A | 9/1997 | Aucsmith | |
| 5,712,800 A | 1/1998 | Aucsmith | |
| 6,963,645 B2 | 11/2005 | Chen et al. | |
| 7,464,267 B2 * | 12/2008 | Zhu et al. | 713/168 |
| 2002/0053002 A1 * | 5/2002 | Brandin | 711/108 |
| 2003/0133567 A1 * | 7/2003 | Yajima et al. | 380/30 |
| 2004/0260931 A1 | 12/2004 | Fischer et al. | |
| 2007/0165843 A1 * | 7/2007 | Lauter et al. | 380/30 |
| 2007/0245119 A1 * | 10/2007 | Hoppe | 711/216 |

* cited by examiner

*Primary Examiner* — Jason Lee
(74) *Attorney, Agent, or Firm* — Schwegman Lundberg & Woessner, P.A.

(57) ABSTRACT

Techniques for reducing storage space and detecting corruption in hash-based applications are presented. Data strings are hashed or transformed into numerically represented strings. Groupings of the numeric strings form a set. Each numeric string of a particular set is associated with a unique co-prime number. All the numeric strings and their corresponding co-prime numbers for a particular set are processed using a Chinese Remainder Theorem algorithm (CRT) to produce a single storage value. The single storage value is retained in place of the original numeric strings. The original numeric strings can be subsequently reproduced and verified using the single storage value and the co-prime numbers.

11 Claims, 3 Drawing Sheets

FIG. 4

TECHNIQUES FOR REDUCING STORAGE SPACE AND DETECTING CORRUPTION IN HASH-BASED APPLICATION

BACKGROUND

In software-based applications there is frequently the need to uniquely store data within and quickly retrieve data from limited sized data structures or storage locations. Generally, to achieve storage mapping and rapid information retrieval, hashing techniques are implemented. In a basic hashing approach, data is hashed to a key. In some situations, the key provides a direct index value into storage or a data structure for purposes of subsequently locating the original data. Sometimes, there are data collisions meaning that duplicate keys exists for different data, when this occurs inefficiency results because to locate the data, chaining techniques are used or linked lists traversal place.

Hashing is also beneficial in the security arts. For example, typically it is not desirable to store a password of a user; rather, the password is hashed to a key and the key is stored and matched when a user supplies the password. In this manner, the service never actually knows the password of a user but knows how to hash a received password to a key and then match that hashed key to a stored key to validate the user. However, even though the password is not stored the hashed key, which is really an encrypted form of the password, is stored. So, there still exist some security risks with this approach.

Furthermore, some approaches do store the passwords in a password database. When this occurs, the security risks are obvious in that the password can be compromised if the password database is penetrated. This technique also requires a large amount of storage to house the password.

Another shortcoming in the above mentioned password approaches is that the approaches do not have a built-in mechanism to detect corruption in the data. So, if a password of a user becomes corrupted, then the user cannot be authenticated. Message digests may be used for the entire password database or for each password entry in the password database individually, but doing this becomes very inefficient because every time a change occurs the entire database has to be recalculated to generate the message digest. Moreover, the storage required to house the message digest can become impractical in many situations.

Thus, improved and automated techniques are desirable to reduce storage space in processing devices and processing environments and to improve the detection of data corruption in hash-based applications.

SUMMARY

In various embodiments, techniques for reducing storage space and detecting corruption in hash-based applications are presented. More specifically and in an embodiment, a method is provided for reducing storage space required for a processing device or processing environment. A set of data strings are acquired; each data string is represented in or transformed into a numeric Integer format. A unique prime number is obtained for use with each data string. Next, a single storage value is calculated for purposes of representing the entire set of the data strings. The single storage value is calculated by processing a Chinese Remainder Theorem algorithm (CRT) against each of the data strings and their corresponding prime numbers to obtain the single storage value. Finally, the single storage value is returned to a requesting application as an Integer that when combined with the prime numbers can independently reproduce each of the data strings in the numeric Integer format for purposes of string recreation or string verification.

DETAILED DESCRIPTION

A "resource" as used herein refers to a service, an application, a processing environment, a user, a group of users, a role associated with a user or groups of users, a policy, a website, a proxy, a device, data or content, or various combinations of these things. A "secure resource" is one that requires authentication to permit access to it. The terms "instructions," "application," and "service" may be used interchangeably herein as form of a resource that executes on a machine (processing device, such as a computer, etc.).

Various embodiments of this invention can be implemented in existing network architectures. For example, in some embodiments, the techniques presented herein are implemented in whole or in part in the Novell® network and proxy server products, directory products, operating system (OS) products, and/or identity based products, distributed by Novell®, Inc., of Provo, Utah.

Of course, the embodiments of the invention can be implemented in a variety of architectural platforms, OS and server systems, or applications. Any particular architectural layout or implementation presented herein is provided for purposes of illustration and comprehension only and is not intended to limit aspects of the invention.

Figure 1:
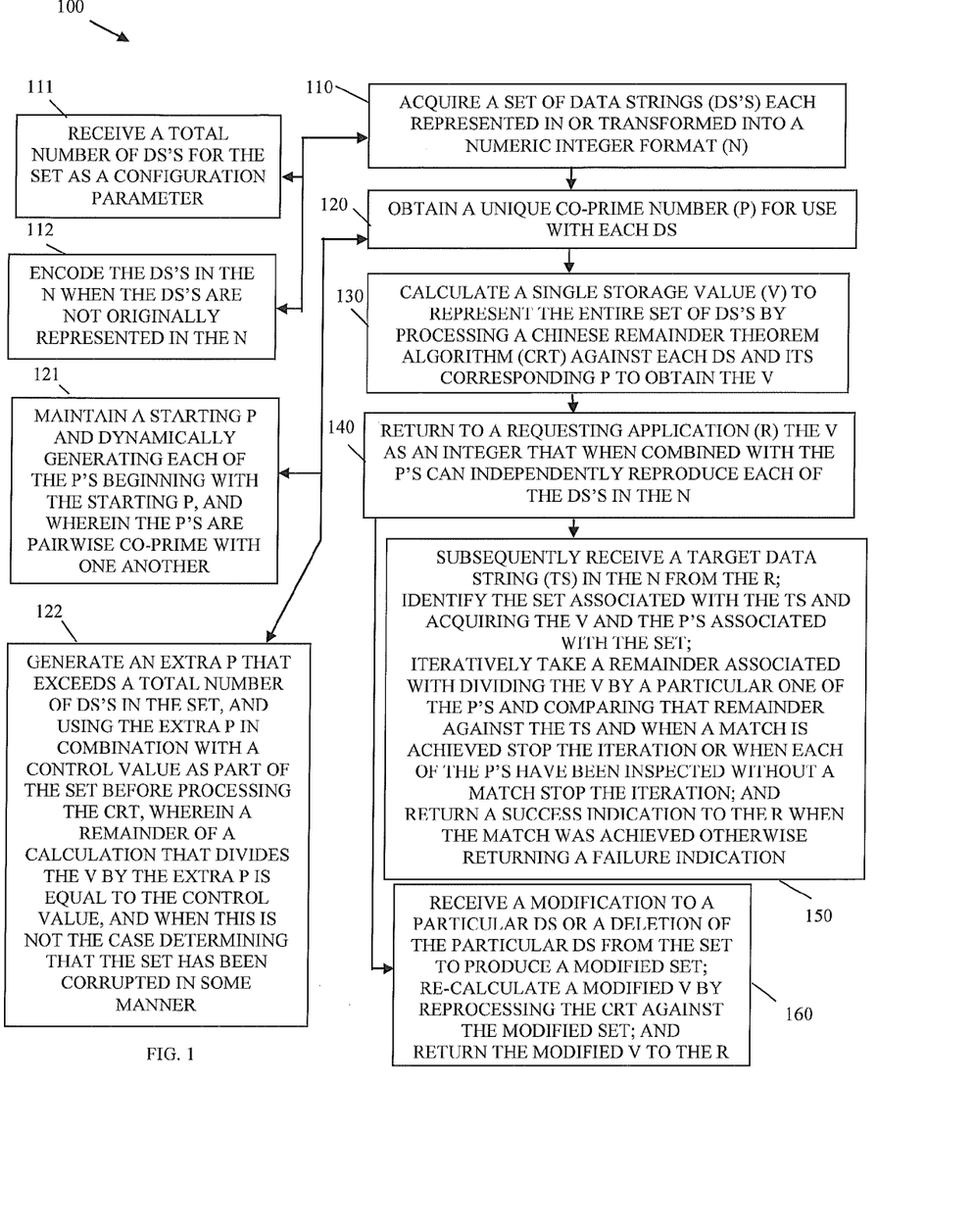
FIG. 1 is a diagram of a method for reducing storage space of a processing device or processing environment according to an example embodiment.

FIG. 1 is a diagram of a method 100 for reducing storage space of a processing device or processing environment according to an example embodiment. The method 100 (hereinafter "storage service") is implemented in a machine-accessible and readable medium. The storage service is operational over and processes within a network. The network may be wired, wireless, or a combination of wired and wireless.

At 110, the storage service receives a set of data strings from a requesting application. The data strings can be acquired individually from the requesting application that interacts with the storage service or the requesting application can pass a handle, such as a pointer reference, to the entire set of data strings. For example, a requesting application can pass a pointer or a reference to a database, a user-defined data structure, a directory, a file, etc. The pointer reference permits the storage service to acquire the data strings.

In an embodiment, at 111, the storage service receives a total number of data strings that comprise the set as a configuration parameter. In other words, the number of data strings that permissibly makes up a set can be configured into the processing associated with the storage service or can be dynamically communicated as instructions to the storage service via a processing parameter from a requesting application.

Again, at 110, the storage service receives the data strings from a requesting application in a numeric Integer format. In other cases, at 112, the storage service transforms the received data strings by encoding or hashing the data strings into a numeric Integer format. Thus, the storage service after 110 deals with each of the data strings as if it were an Integer value.

At 120, the storage service obtains a unique co-prime number for use with each of the data strings (in the Integer format). In other words, a set of unique co-prime numbers are obtained for use with the data strings. This can be achieved in a variety of manners.

For example, at 121, the storage service maintains a starting co-prime number with the set of data strings and dynamically generates each of the co-prime numbers in the set of co-prime numbers beginning with the starting co-prime number. The set of co-prime numbers are pairwise co-prime. This means that each pair of numbers in that set of prime numbers are co-prime (have no common divisors other than 1). For example, 7 and 10 are pairwise co-prime because the only common divisor is 1.

In an embodiment, at 122, the storage service generates an extra co-prime number that exceeds a total number of data strings in the set of data strings. The extra co-prime number is associated with a selected control value and is included in the set of data strings that are processed with the discussion at 130. A calculated remainder for the single storage value (V) (discussed below at 130) divided by the extra co-prime number (P) equals the control value (C) (C=V mod P). This permits corruption to be detected in the set of data strings such that when the storage service determines that C≠V mod P, the set of data strings has become corrupted in some manner (more discussion of this is presented herein and below).

At 130, the storage service calculates a single storage value to represent the entire set of the data strings. This is done by processing a Chinese Remainder Theorem algorithm (CRT) against each data string and its corresponding and assigned unique prime number. Each data string represents an equation. So, consider as an example two data strings represented as A1 and A2 and two co-prime numbers represented as P1 and P2. There are three total equations for the CRT to solve, namely: X=A1 (mod P1); X=A2 (mod P2); and X=R (control value discussed above with reference to the processing at 122) (mod P3 (extra co-prime number for the control value)). Processing the CRT provides a value for X and X represents the single storage value. When X is subsequently divided by one of the co-prime numbers, say P1 it yields as a remainder one of the data strings, in this example A1. So, the single storage value when combined with the co-prime numbers can be used to recreate each of the data strings in the original set. Therefore, a single Integer value (X) can be retained in storage to represent a plurality of data strings that comprise a set. This has two benefits, first it obviously reduces storage space and second it provides added security because not even an encrypted form of the data strings is retained rather just the value of X calculated using a CRT.

As an example of how the CRT works consider that A1 (first data string in Integer format)=3; and A2 (second data string in Integer format)=7; P1=7 (first co-prime number in the pairwise co-prime set); and P2=13 (second co-prime number in the pairwise co-prime set). The product N of the co-prime numbers in the set (7 and 13)=91. So, 91/7 (P1)=13; and 91/13 (P2)=7. The equation to solve becomes 13x+7y=1; solving for x and y yields x=−1 and y=2, such that −13 (13*−1)+14 (7*2)=1. Thus, the single storage value (S) becomes S=3*13*−1 (A1*(91/7 (P1))*x)+7*7*2 (A2*(91/13(P2))*y)=−39+98=59. We can check by seeing that 59 (S) mod 7 (P1) is equal to 3 (which is A1) and that 59 (S) mod 13 (P2) is equal to 7 (which is A2). This is but one simple example of using the CRT to find a single storage value from a set of two data strings and corresponding co-prime numbers, in practice any number of N data set strings and co-prime numbers can be solved to find the single storage value.

At 140, the storage service returns to a requesting application the single storage value calculated at 130. This single storage value can be subsequently used when combined with the co-prime numbers to reproduce each of the original data strings and to verify other data strings to see if there is a match or to see if corruption has occurred in the set of data strings.

For example, at 150, the storage service subsequently receives a target data string in the Integer numeric format from the requesting application. The set of co-prime numbers to which this target data string is associated is identified. For example, the target data string may be a password, such that a user identifier can be used to match the target data string to the proper set of co-prime numbers. Next, the storage service iteratively divides the single storage value associated with the set of co-prime numbers by each of the co-prime numbers in the set to acquire a remainder value (note that a standard mod operation can be used to immediately acquire the remainder value in practice). Each remainder value is then compared against the target string when a match occurs the iteration can cease or stop and the target string is successfully verified. Iteration can also stop after each of the co-prime numbers in the set has been processed and no match is detected, which indicates that the target data string cannot be verified. Example processing associated with achieving this was discussed above in the example where the single storage value was 59 and the strings were 3 and 7 and the primes were 7 and 13 respectively. Here, if the target string is 7 then when 59 is divided by 13 the remainder is 7 (59-52 (13*4)) and a match occurs so the target string is verified successfully. If the target string was 8 then no verification would occur at all because 59 divided by each of the primes in the set (7 and 13) yields only a 3 and a 7 and not an 8.

According to an embodiment, at 160, the storage service receives a modification to a particular one of the data strings or receives a deletion request for one of the data strings from the set of data strings. This results in a modified set of data strings. So, the storage service re-calculates a modified single storage value by reprocessing the CRT against the modified set and the co-prime numbers. Next, the modified single storage value is returned to the original requesting application. Thus, the storage service can keep changes to the data strings in the set in synchronization by updating re-calculating the single storage value each time a data string is modified, deleted, or added to the set. Also, note that the co-prime numbers increase with an added data string to the set and decrease with a deleted data string to the set.

Figure 2:
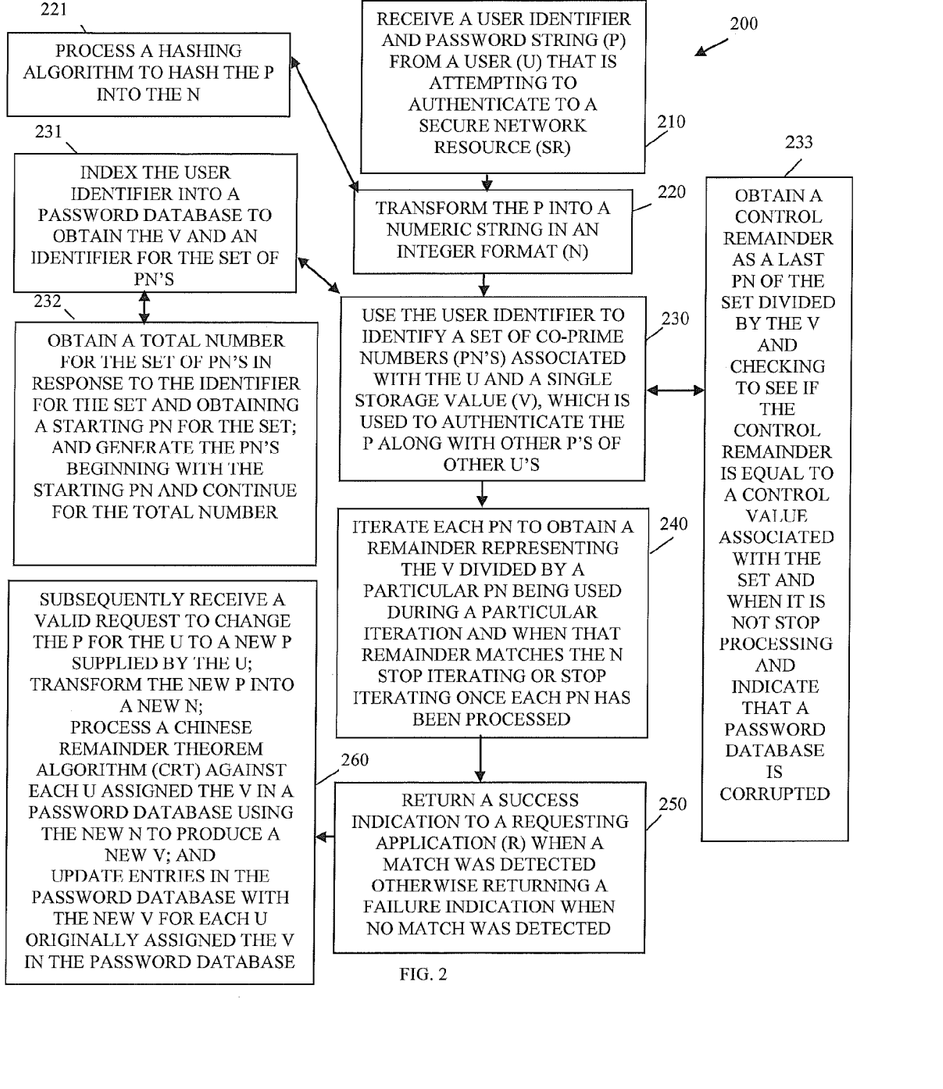
FIG. 2 is a diagram of a method for password authentication using techniques presented with respect to the FIG. 1, according to an example embodiment.

FIG. 2 is a diagram of a method 200 for password authentication using techniques presented with respect to the FIG. 1, according to an example embodiment. The method 200 (hereinafter "authentication service" is implemented in a machine-accessible and readable medium and is operational over a network. The network may be wired, wireless, or a combination of wired and wireless.

In an embodiment, the authentication service interacts with a password database that is managed and produced by the storage service represented by the method 100 of the FIG. 1.

The authentication service represents a specific example implementation (password authentication) and use of the storage service represented by the method 100 of the FIG. 1.

At 210, the authentication service receives a user identifier and a password string from a user. The user is attempting to authenticate to a secure network resource.

At 220, the authentication service transforms the password string into a numeric string in an Integer format. According to an embodiment, at 221, the authentication service processes a hashing algorithm to hash the password string into the numeric string, which is in the Integer format.

At 230, the authentication service uses the user identifier to identify a set of co-prime numbers associated with the users and to identify a single storage value. The single storage value is used to authenticate the password string along with other password strings associated with other users.

In an embodiment, at 231, the authentication service indexes the user identifier into a password database to obtain the single storage value and an identifier for the set of co-prime numbers. At 232, the authentication service obtains a total number for the set of the co-prime numbers in response to the identifier for the set. Moreover, the authentication service obtains a starting co-prime number for the set. In response to this, the authentication service generates the co-prime numbers beginning with the starting co-prime number and continuing for the total number of co-primes in the set of co-prime numbers.

According to an embodiment, at 233, the authentication service also obtains a control remainder as a last co-prime number of the set of co-primes divided by the single control value. The authentication service can use the control value to check and see if control remainder is equal to a known control value associated with the set of co-primes. When the control remainder is not equal to the control value processing stops and a notice is sent to a requesting application that the password database is potentially corrupted.

At 240, the authentication service iterates each co-prime number to obtain a remainder representing the single control value divided by a particular one of the co-primes during a particular iteration. When a remainder, during a particular iteration, matches the password string in the Integer format, the iterating stops. The iterating also stops once each co-prime number has been processed.

An alternative mechanism (to the processing at 240) that can be used by the authentication service is for the entry number of the user identifier to match a particular co-prime number in the set of co-prime numbers. In this approach, iteration of each of the co-primes in the set of co-primes is not needed because the proper co-prime number from the set of co-primes that is associated with the user is obtained based on the entry number for the user in the password database. The authentication service then divides the single control value by the acquired co-prime and if it matches the password string authentication is successful; otherwise it is not. This is a quicker and more straightforward approach in which the entire set of co-primes do not have to be iterated to perform authentication. So, as an example if the user is the $4^{th}$ entry in the password database, then the authentication service acquires the $4^{th}$ co-prime from the co-prime set and divides the single storage value by that co-prime number with the remainder being checked against the password string to see if a match exists (a successful match provides authentication).

At 250, the authentication service returns a success indication to a requesting application when a match was detected at 240; otherwise returning a failure indication when no match was detected at 240. In other words, the password string is capable of being authenticated and matched in the password database via a single control value and a set of known co-prime numbers. The manner in which the single control value is produced was discussed in detail above with reference to the method 100 of the FIG. 1.

In an embodiment, at 260, the authentication service subsequently receives a valid request to change the password string for the user to a new password supplied by the user. The authentication service then transforms the new password into a new string in Integer format. A CRT is then processed against each user assigned to the same single control value in the password database using the new string for purposes of producing a new single control value. Password entries are then updated in the password database with the new single control value for each user originally assigned to the single control value within the password database.

Some example illustrations to further provide comprehension of the authentication service are now provided.

Overview of Chinese Remainder Theorem (CRT)

Suppose $n_1, n_2, \ldots, n_k$ are integers which are pairwise co-prime. Then, for any given integers $a_1, a_2, \ldots, a_k$, there exists an integer x solving the system of simultaneous congruencies, such that:

$$x \equiv a_1 (\bmod n_1)$$
$$x \equiv a_2 (\bmod n_2)$$
$$\vdots$$
$$x \equiv a_k (\bmod n_k)$$

Furthermore, all solutions x to this system are congruent modulo the product $N = n_1 n_2 \ldots n_k$.

For an authentication module, suppose the input to it from a user X is a r-tuple $(ip_{x1}, ip_{x2}, \ldots ip_{xr})$. And there is a one-way function 'f' which maps this input to a string of numbers as output, such that, $$OP_x = f(ip_{x1}, ip_{x2}, \ldots ip_{xr}) = f(IP_x)$$

where 'f' is the function that generates the unique OP for the given input. For example, this 'f' can be a message digest as used in the Linux authentication module.

Consider IP as the set of inputs of all the users, so that:

IP(Input Set)=$\{IP_1, IP_2, \ldots\}$ and
OP(Data Set)=$\{OP_1 = f(IP_1), OP_2 = f(IP_2), \ldots\}$ In the new authentication module, one has 'n+1' pairwise co-prime, say, $$CP = \{CP_1, CP_2, \ldots CP_n, Cp_{n+1}\}$$

and a number R less than the minimum of the above n+1 co-prime.

This co-prime set and the number R is unique for the total system. This co-prime set is used for storing a single entity 'N' for a set of 'n' users using CRT, as explained below.

For a set of 'n' users in the database, obtain the following CRT equations:

$$N \equiv OP_1 (\bmod CP_1)$$
$$N \equiv OP_2 (\bmod CP_2)$$
$$\vdots$$
$$N \equiv OP_n (\bmod Cp_n)$$
$$N \equiv R (\bmod CP_{n+1})$$

Solve for 'N' by applying CRT algorithm over the above set of equations. Then, for every 'n' users, instead of storing 'n' Ops (i.e. OP={OP$_1$, OP$_2$ . . . OP$_n$}) in database, storing only one 'N'. The storage space needed for this 'N' is usually less compared to that needed for storing the Data Set, OP. Through statistics, one can arrive at a set of co-primes which yields a small value of 'N'.

Scenario 1: Authentication Processing

Authentication is done as follows:

When a user 'X' comes in with his/her IP$_x$, find OP$_x$ by applying function 'f' on Ipx.

Lookup the 'N' & CP$_r$ for user 'X' where CP$_r$ belongs to CP set.

Check whether 'N mod CP$_{n+1}$' is equal to R. If not, it implies this part of database is corrupted. One can then take appropriate action like notifying an administrator.

We then find 'N mod CP$_r$'

Check if value obtained above is equal to OP$_x$, found in 1$^{st}$ step, if true, user is successfully authenticated.

Scenario 2: Addition of New User

When a new user comes in, say user 'Y', his/her addition to user database is as follows:

Obtain OP$_y$ from his input r-tuple by applying function 'f'.

Find a 'N' in database, which is formed by 'k' (k<n) CRT equations, $$N \equiv OP_1 (\bmod\ CP_1)$$
$$N \equiv OP_2 (\bmod\ CP_2)$$
$$\vdots$$
$$N \equiv OP_k (\bmod\ CP_k)$$

Apply CRT on 'N' in reverse way to get the corresponding Data Set OP: {OP$_1$, OP$_2$, . . . OP$_k$}

Solve for the set of 'k'+1 equations (2<='k'<=n) for new 'N' value.

$$N_{new} \equiv OP_y (\bmod\ CP_{k+1})$$
$$N_{new} \equiv OP_1 (\bmod\ CP_1)$$
$$\vdots$$
$$N_{new} \equiv OP_k (\bmod\ CP_k)$$

Update the database with this new 'N$_{new}$' value in place of 'N'

Modify also follows same as addition of new user.

Scenario 3: Deletion of User

Deletion of an user D is similar to addition of new User. First authenticate the user, then like in above scenario obtain the 'k' equations. But instead of solving for 'k+1' equations, solve for 'k−1' i.e. leaving out the equation corresponding to user being deleted and obtain new 'N'. Then update the database with this new 'N'.

Thus, the above solution can be used for obtaining better savings in storage space and at the same time letting one detect corruption in database without using any extra memory.

Figure 3:
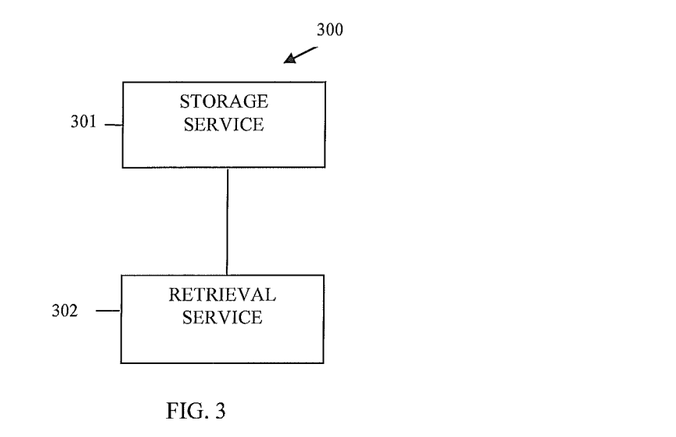
FIG. 3 is a diagram of a storage space reduction and verification system, according to an example embodiment.

FIG. 3 is a diagram of a storage space reduction and verification system 300, according to an example embodiment. The storage space reduction and verification system 300 is implemented in a machine-accessible and readable medium as instructions that process on one or more machines. Moreover, the storage space reduction and verification system 300 is operational over a network. The network may be wired, wireless, or a combination of wired and wireless. In an embodiment, the storage space reduction and verification system 300 implements, among other things, the storage service represented by the method 100 of the FIG. 1.

The storage space reduction and verification system 300 includes a storage service 301 and a retrieval service 302. Each of these will now be discussed in turn.

The storage service 301 is implemented in a machine-accessible and computer-readable medium as instructions that execute on a machine (computer or processor-enabled device). Example processing associated with the storage service 301 was presented in detail above with reference to the method 100 of the FIG. 1.

The storage service 301 reduces a plurality of numerically represented strings into a single storage value by processing a CRT against those numerically represented strings. The storage service 301 also retains the single storage value along with an identification for a set of pairwise co-prime numbers used with the CRT.

In an embodiment, the storage service 301 produces a control value with the single storage value that the retrieval service 302 can use to validate that storage associated with the numerically represented strings has not become corrupted.

According to an embodiment, the numerically represented strings are originally represented as content that is hashed into the numerically represented strings using a hash-based algorithm.

In another case, the numerically strings are received as a pointer to one or more of the following: a user-defined data structure, a database, a file, and a directory. The storage service 301 receives the pointer from a requesting application before producing the single storage value.

The retrieval service 302 is implemented in a machine-accessible and computer-readable medium as instructions that execute on the same machine as the storage service 301 or an entirely different network machine from that which is associated with the storage service 301. Example processing associated with the retrieval service 302 was provided in detail above with reference to the method 100 of the FIG. 1 and with reference to authentication service for passwords that was discussed with reference to the method 200 of the FIG. 2.

The retrieval service 302 is to verify and reproduce each of the numerically represented strings when requested to do so in response to the single storage value and the identification for the set of co-prime numbers. Example techniques for doing this were presented above with reference to the method 200 of the FIG. 2.

According to an embodiment, the retrieval service 302 dynamically generates the set of co-prime numbers when needed in response to the identification for the set. The identification permits a starting co-prime to be resolved and a total number of co-primes for the set to be resolved.

In a particular situation, the retrieval service 302 iterates the set of co-prime numbers when a target string is received in an attempt to reproduce the target string from the single storage value and one of the co-prime numbers. When reproduction is successful, the target string is verified; otherwise, the target string is not verified.

Figure 4:
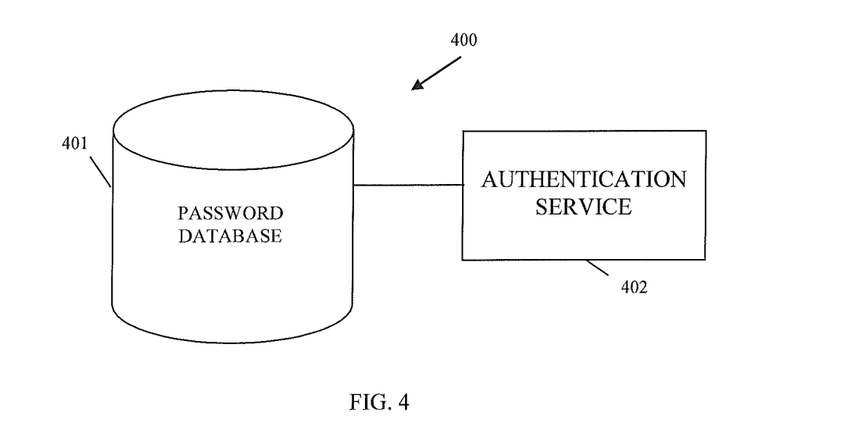
FIG. 4 is a diagram of a password authentication system using techniques presented herein, according to an example embodiment.

FIG. 4 is a diagram of a password authentication system 400 using techniques presented herein, according to an example embodiment. The password authentication system 400 is implemented in a machine-accessible and computer-readable medium and is processed on machines by services of a network. The network may be wired, wireless, or a combination of wired and wireless.

In an embodiment, the password authentication system 400 implements among other things the authentication service represented by the method 200 of the FIG. 2.

The password authentication system 400 includes a password database 401 and an authentication service 402. Each of these and their interactions with one another will now be discussed in turn.

The password database 401 is implemented in a machine-accessible and computer-readable medium and is accessible to the network services, such as the retrieval service 302 of the system 300 discussed above with reference to the FIG. 3. The password database 401 is also accessible to the authentication service 402.

The password database 401 includes a variety of information that is updated by the services that generate and maintain the password database 401, such as the authentication service 402 and the storage service 301 of the system 300 discussed above with reference to the FIG. 3.

The password database 401 includes a single entry for each user associated with a secure network resource account. The password database 401 includes a plurality of entries. Each entry of the password database 401 includes a user identification, a storage value, and a co-prime number set identifier. Moreover, groupings of users, which are represented by different user identifications and for different entries of the password database 401, share a same identical storage value.

According to an embodiment, each entry in the password database 401 also includes a set size for the set of co-prime numbers. The co-prime number set identifier is represented as a beginning co-prime number for the set of co-prime numbers.

The authentication service 402 is implemented in a machine-accessible and computer-readable medium as instructions that execute on one or more of the network machines. Example processing associated with the authentication service 402 was provided in detail above with reference to the FIG. 1.

The authentication service 402 uses any particular or given storage value in combination with any particular or given co-prime number set identifier to verify a particular user's password when a particular user attempts to authenticate to a secure network resource.

According to an embodiment, the authentication service 402 reproduces the set of co-prime numbers by starting at a beginning co-prime number and generating the set of co-prime numbers as pairwise co-prime numbers for the set size.

In an embodiment, the single storage values are updated within the password database 401 by processing a CRT when a particular user is removed from the password database 401 or when the particular user changes a particular password.

One now fully appreciates how storage space and password databases in particularly can be substantially reduced in terms of their storage sizes. This is achieved by calculating and using a single storage value and a set of co-prime numbers to process a CRT. Thus, encrypted values of passwords or data are never stored just the single storage value and the single storage value is used for a plurality of different passwords or data content. This substantially reduces storage space, improves security, improves detection of data corruption in hash-based applications, and improves data verification from what has been conventionally achieved to date.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method, comprising:
    acquiring a set of data strings each transformed into a numeric Integer format and the set of data strings acquired from a requesting application as a pointer reference to a directory having the set of data strings;
    obtaining a unique co-prime number for use with each data string, maintaining a starting co-prime number and dynamically generating each of the co-prime numbers beginning with the starting co-prime number, and wherein the co-prime numbers are pairwise co-prime with one another;
    calculating a single storage value to represent the entire set of the data strings by processing a Chinese Remainder Theorem algorithm (CRT) against each of the data strings and their corresponding co-prime numbers to obtain the single storage value; and
    returning to a requesting application the single storage value as an Integer That when combined with the co-prime numbers can independently reproduce each of the data strings in the numeric Integer format.

2. The method of claim 1, wherein acquiring further includes receiving a total number of data strings for the set as a configuration parameter.

3. The method of claim 1, wherein acquiring further includes encoding the data strings in the numeric Integer format when the data strings are not originally represented in the numeric Integer format.

4. The method of claim 1, wherein obtaining further includes generating an extra co-prime number that exceeds a total number of data strings in the set, and using the extra co-prime number in combination with a control value as part of the set before processing the CRT, wherein a remainder of a calculation that divides the single storage value by the extra co-prime number is equal to the control value.

5. The method of claim 1 further comprising:
    subsequently receiving a target data string in the Integer format from the requesting application;
    identifying the set associated with the target data string and acquiring the single storage value and the co-prime numbers associated with the set;
    iteratively taking a remainder associated with dividing the single storage value by a particular one of the co-prime numbers and comparing that remainder against the target data string and when a match is achieved stop the iteration or when each of the co-prime numbers have been inspected without a match stop the iteration; and returning a success indication to the requesting application when the match was achieved otherwise returning a failure indication to the requesting application.

6. The method of claim 1 further comprising:

receiving a modification to a particular data string or a deletion of the particular data string from the set to produce a modified set;

re-calculating a modified single storage value by reprocessing the CRT against the modified set; and returning the modified single storage value to the requesting application.

7. A machine-implemented system, comprising:

a machine having a storage service implemented in a non-transitory computer-readable medium and the storage service executes on the machine; and the machine or a different machine having a retrieval service implemented in a non-transitory computer-readable medium and the retrieval service executes on the machine or the different machine;

wherein the storage service is to reduce a plurality of numerically represented strings into a single storage value by processing a Chinese Remainder Theorem algorithm (CRT) against those numerically represented strings and the storage service retains the single storage value along with an identification for a set of co-prime numbers used with the CRT, and wherein the retrieval service is to verify and reproduce each of the numerically represented strings when requested to do so in response to the single storage value and the identification for the set of co-prime numbers, the numerically represented strings received as a handle to a directory having a set of data strings that are transformed into the numerically represented strings and represented as the single storage value, and wherein the retrieval service dynamically generates the set of co-prime numbers when needed in response to the identification for the set, wherein the identification permits a starting prime number to be resolved and a total number of co-prime numbers for the set to be resolved.

8. The system of claim 7, wherein the numerically represented strings are originally represented as content that is hashed into the numerically represented strings using a hash-based algorithm.

9. The system of claim 7, wherein the storage service produces a control value with the single storage value that the retrieval service can use to validate that storage associated with the numerically represented strings has not become corrupted.

10. The system of claim 7, wherein the numerically represented strings are received as a pointer to one or more of the following: a user-defined data structure, a database, a file, and a directory, and the storage service receives the pointer from a requesting application before producing the single storage value.

11. The system of claim 7, wherein the retrieval service iterates the set of co-prime numbers when a target string is received in an attempt to reproduce the target string from the single storage value and one of the co-prime numbers and when reproduction is successful the target string is verified otherwise it is not verified.

* * * * *

UNITED STATES PATENT AND TRADEMARK OFFICE
CERTIFICATE OF CORRECTION

| | | |
|---|---|---|
| PATENT NO. | : 8,776,191 B2 | Page 1 of 1 |
| APPLICATION NO. | : 12/019671 | |
| DATED | : July 8, 2014 | |
| INVENTOR(S) | : Vishnu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1748 days.

Signed and Sealed this
Twenty-first Day of July, 2015

Michelle K. Lee
*Director of the United States Patent and Trademark Office*